United States Patent [19]

Symes et al.

[11] Patent Number: 4,798,888

[45] Date of Patent: Jan. 17, 1989

[54] DRY POLYMERS

[75] Inventors: Kenneth C. Symes; Peter Flesher, both of West Yorkshire, United Kingdom

[73] Assignee: Allied Colloids Ltd., England

[21] Appl. No.: 719,671

[22] Filed: Apr. 4, 1985

Related U.S. Application Data

[63] Continuation-in-part of Ser. No. 609,681, May 11, 1984, Pat. No. 4,571,422, which is a continuation-in-part of Ser. No. 552,591, Nov. 16, 1983, abandoned.

[30] Foreign Application Priority Data

Oct. 19, 1984 [GB] United Kingdom ............... 8426529

[51] Int. Cl.$^4$ .............................................. C08B 37/00
[52] U.S. Cl. ...................................... 536/123; 536/114; 106/170; 106/191; 106/208
[58] Field of Search .................... 536/123, 114, 3; 435/101; 106/170, 191, 208

[56] References Cited

U.S. PATENT DOCUMENTS

| | | | |
|---|---|---|---|
| 2,042,917 | 6/1936 | Von Brandt | 106/208 |
| 3,514,298 | 5/1970 | Noznick et al. | 426/658 |
| 3,894,879 | 7/1975 | Colegrove | 106/208 |
| 3,894,880 | 7/1975 | Colegrove | 106/208 |
| 4,052,353 | 10/1977 | Scanley | 523/335 |
| 4,338,432 | 7/1982 | Lawson et al. | 435/101 |
| 4,372,785 | 2/1983 | Lawson et al. | 106/170 |
| 4,525,515 | 6/1985 | Peignier et al. | 106/170 |
| 4,571,422 | 2/1986 | Symes et al. | 536/114 |
| 4,703,117 | 10/1987 | Fischer et al. | 536/114 |

FOREIGN PATENT DOCUMENTS

| | | |
|---|---|---|
| 1164376 | 3/1984 | Canada . |
| 732547 | 6/1955 | United Kingdom . |
| 905779 | 9/1962 | United Kingdom . |
| 1277577 | 6/1972 | United Kingdom . |
| 1482515 | 8/1977 | United Kingdom . |
| 1546560 | 5/1979 | United Kingdom . |
| 2018300 | 10/1979 | United Kingdom . |

Primary Examiner—Ronald W. Griffin
Attorney, Agent, or Firm—Ostrolenk, Faber, Gerb & Soffen

[57] ABSTRACT

Powdered polysaccharide may be made by spray drying an emulsion in a non-aqueous liquid of an aqueous solution of the polysaccharide. Spray dried polysaccharides are novel materials. At least 90% by weight of the particles may be within a size range of not more than 100 microns. The particles may have an average size between 50 and 250 microns or between 10 and 50 microns, and the finer particles can be redispersed into oil.

15 Claims, No Drawings

DRY POLYMERS

This application is a continuation in part of Ser. No. 609,681 filed 11th May 1984, (now U.S. Pat. No. 4,571,422, issued Feb. 18, 1986) which is a continuation in part of Ser. No. 552,591 filed Nov. 16th, 1983 (now abandoned).

Xanthan and other microbial polysaccharides are made initially by fermentation as very dilute aqueous solutions. Even at very low concentrations these solutions are very viscous. Typically the consistency index of the solutions is above 25,000 cP. Very concentrated solutions thereof cannot easily be handled and when it is necessary to increase the solids content it is conventional to provide the polysaccharide in solid form by precipitation from its solution and then drying the precipitate.

The precipitation and drying is technically quite difficult to conduct and inevitably results in some deterioration in product quality, probably due to hornification or partial insolubilisation during drying. The particulate product generally has a relatively wide range of coarse particle sizes, for instance with the average particle size being 200 microns or greater and with 90% by weight of the particles having a range of sizes of at least 150 and usually 200 microns or more.

The fermentation broth generally consists of the aqueous solution but it is proposed in Canadian Patent Specification No. 1,164,376 to conduct the fermentation in an emulsion in oil of the dilute aqueous solution. The oil must be relatively non-volatile in order that unacceptable quantities are not lost due to the passage of oxygen through the oil during fermentation. The emulsion must be relatively unstable in order that, at the end of fermentation, it can be broken, optionally by addition of an emulsion breaking agent, by high shear, by heating, dilution, or evaporation or other known methods, and the xanthan is then separated from the aqueous phase, optionally after purification, by conventional means such as precipitation and drying. Thus the final product quality is similar to that made by conventional aqueous broth fermentation processes. It is significant that although the process is said to result in enhanced yields, the concentration of xanthan in the resultant aqueous solution is still very low, not more than 2.5% by weight in the Examples.

As is discussed more fully in European Patent Application No. 84303126.1, it is desirable that the polysaccharide should dissolve easily and quickly and should rapidly provide its maximum viscosifying power, particularly for enhanced oil recovery, drilling mud or other downhole use, but existing dried products tend to be rather unsatisfactory despite various published attempts to improve solution rate. In general, a choice has to be made between the use of a viscous dilute aqueous solution (with its associated bulk and handling disadvantages) and solids (with the resultant inferior performance properties).

It has been our object to formulate polysaccharides, and in particular xanthan and other microbial polysaccharides, in a form that has convenience and handling properties the same as or approaching conventional powder form and that has performance qualities better than those of existing solid grade products, preferably approaching or as good as the performance qualities of the solution grade product. This objective has not previously been possible or proposed in the polysaccharide industry, except as described in European Patent Application No. 84303126.1.

It is known in the synthetic polymer industry to obtain a water-in-oil fluid dispersion of aqueous particles of water soluble polymer dispersed in oil by dispersing an aqueous solution of monomer in oil and then polymerising the monomer. There are numerous proposals in the literature, for instance US Patent Specification 4052353, describing drying the resultant dispersion by azeotroping to form a fluid dispersion of substantially dry particles dispersed in oil. In British Patent Specification No. 905,779, it is mentioned that the dispersion of aqueous synthetic polymer particles in oil can be spray-dried.

The possibility of granulating an aqueous gel of a polymer in oil has been recognised (for instance in British Patent Specification No. 1277577) but, as is admitted in that specification, this involves the handling of thick gels and the use of shearing machinery which increases the cost of manufacturing considerably. Also the application of shear to an aqueous gel is liable to damage the polymeric structure, with the result that there is a risk that the performance qualities will again be decreased. This is a particular problem if a fine dispersion, as opposed to a coarse granular product is desired. Accordingly it is recognised that it is not satisfactorily possible to form the water-in-oil polymer dispersion starting from a solution of the polymer and in practice the water in oil polymer dispersion is always made by in situ polymerisation.

It is known from examples 13 and 14 of U.S. Pat. No. 3,979,349 to disperse, respectively, 20% aqueous gelatin and 10% aqueous polyvinyl alcohol in oil but these solutions are unusual polymeric solutions in that they have much lower viscosity than most water soluble polymers and so dispersion can be achieved by such low shear, for instance simple stirring, that there is no danger of damaging the polymer. For instance, a typical 10% aqueous polyvinyl alcohol solution may have a consistency index below 3,000 cP. These solutions therefore are entirely different from the aqueous polymers that the industry has accepted can not conveniently be dispersed into oil and are entirely different from the very viscous polysaccharide solutions that at present are used for, for instance, enhanced oil recovery.

As described in European Patent Application No. 84303126.1, that it is possible to form an emulsion in oil of an aqueous polysaccharide solution having a consistency index that is so high that one would not expect to be able conveniently and satisfactorily to emulsify it into water, for instance above 10,000 or 20,000 cP and often above 50,000 cP, using conventional and economically acceptable dispersing apparatus and that this can be done without causing significant damage to the final properties of the polysaccharide. That application is concerned with the production of liquid compositions and describes how the emulsion can be made more concentrated. The described concentration method involves azeotropic distillation.

In the present invention we are not concerned with the concentration of an emulsion but are instead concerned with the production of polysaccharide in substantially dry, powder form.

In a first aspect of the invention, we spray dry an emulsion in a non-aqueous liquid of an aqueous solution of a polysaccharide and thereby produce polysaccharide powder substantially free of non-aqueous liquid.

During the spray-drying, the non-aqueous liquid is substantially entirely evaporated and so we do not obtain a concentrated emulsion but, instead, we can obtain solid particles of uniform particle size and having very desirable characteristics. The product, spray dried polysaccharide (preferably microbial polysaccharide) is novel.

It is essential, when conducting a spray-drying process, to minimise the capital and energy requirements as otherwise the process is uneconomic. It is therefore commercially necessary that the concentration of polysaccharide in the emulsion and in the aqueous component should be as high as possible consistent with ability to handle it and to disperse it into oil, so as to maximise the polysaccharide solids put into the dispersion. For instance, if the solution only has a concentration typical of xanthan fermentation broth, up to 2.5% maximum, spray-drying of an emulsion of this solution is likely to be uneconomic. Generally, the concentration of the polysaccharide in the aqueous solution that is in the emulsion should be at least 4% by weight, preferably at least 5% and most preferably 7 to 10% or sometimes more, for instance up to 15% or even 20%, depending upon the polysaccharide. The aqueous dispersion that is to be spray dried preferably contains from 30 to 75%, preferably 50 to 75% by weight aqueous phase with the balance being the non-aqueous phase.

This means that the polysaccharide content of the emulsion will always be quite low, usually above 1% but below 10 or 15%, typically 2 to 6% by weight. Higher concentrations are impracticable because of, for instance, the difficulty of emulsification. Spray drying of dilute liquids normally gives hollow crushable particles, and therefore a wide range of particle sizes and it is surprising that in the invention it is possible to obtain solid particles of a narrow range of particle sizes despite the low concentration of the emulsion.

The solution may be obtained in any convenient manner. Preferably it is a concentrate obtained from the broth in which the microbial polysaccharide is initially prepared. However in some instances it is useful to form the solution by dissolving powder in water e.g. when it is desired to facilitate the production, by a user, of an aqueous solution that is more concentrated than can conveniently be made from powder.

The emulsion is preferably formed by emulsifying preformed aqueous solution into oil, but the polysaccharide solution may, alternatively, be formed in water droplets previously emulsified into oil. The aqueous solution that is emulsified into non-aqueous liquid is preferably a concentrate obtained from a fermentation broth. Although the invention can be applied to a wide range of polysaccharides, and therefore to solutions having a wide range of viscosities, it is of particular value when the polysaccharide solution has a consistency index above 10,000 cP, and preferably above 20,000 cP, but solutions of lower viscosity can be used. The consistency index may be above 50,000 and is often 100,000 or more, for instance up to half a million, cP. For instance, a typical 7% Xanthan solution may have a consistency index of about 66,000 cP.

The emulsification of the polysaccharide solution can be conducted using conventional emulsifying apparatus, with the aqueous solution generally being added gradually to the non-aqueous phase. The degree of shear and emulsification will affect the particle size of the emulsion. The solution may include alkali, generally ammonia, to raise the pH up to, for instance, 9 or 10. The solution is generally free of formaldehyde, since its presence may cause uncontrolled cross-linking.

The non-aqueous liquid can be any liquid which is immiscible with the aqueous phase and which is volatile such that it can subsequently be removed during spray drying. It is generally a mineral oil, diesel oil, vegetable oil, or a halogenated hydrocarbon. Examples of suitable liquids are perchlorethylene and commercially available hydrocarbons with boiling ranges below 250° C. and preferably below 150° C., but generally above 50° C., most preferably within the range 70° to 150° C. Halogenated hydrocarbons such as perchlorethylene and other non-aqueous liquid that have a higher density than conventional aliphatic low boiling hydrocarbons are desirable since they facilitate the production of a stable emulsion with low quantities of surfactant and/or stabiliser, or in the total absence of surfactant and/or stabiliser.

Polar liquids may be included in the emulsion (generally by admixture with the oil) to facilitate emulsification and/or to improve stability of the composition and/or to act as a humectant for the polysaccharide. Glycols, for instance ethylene glycol, and glycol ethers are suitable.

The emulsion must be sufficiently stable that it does not break before spray drying. The emulsion may be formed immediately before spray drying, in which event storage stability is not required. It may even be formed at the spraying nozzle with simultaneous emulsification and spraying. Alternatively the emulsion may be made and then stored, in which event it must be storage stable in the sense that the aqueous phase remains emulsified throughout the oil or, if the aqueous phase tends to settle, then it must be easy to emulsify it back into the oil.

Surfactant may be included to facilitate reduction of particle size and/or to improve stability. Surfactants that will serve as water in oil emulsifiers generally have a low HLB value at 20° C. while surfactants that have high HLB values normally lead to the formation of an oil in water emulsion or to the formation of a very unstable emulsion. Although surfactants having, e.g. HLB of 3 to 6 can be used in the invention, the emulsion is preferably formed using a surfactant which serves as a water in oil emulsifier during the formation of the emulsion but which at 20° C. has an HLB value of at least 6.5, generally at least 7 and typically 8 to 11, preferably 9.5 to 10.5. Some of these high HLB surfactants are water in oil emulsifiers at 20° C. and so can be used at ambient temperatures. Other high HLB surfactants are oil in water emulsifiers at ambient temperatures but become water in oil emulsifiers when heated to above their phase inversion temperature. With such emulsifiers it is then desirable to form the emulsion above the phase inversion temperature of the surfactant.

Preferably the emulsion is, at some stage during or after its preparation, heated to a temperature of at least 50° C., e.g. 50° to 120° C. and preferably 75 to 95° C. Thus hot oil may be added to cold solution or hot solution may be added to cold oil or cold oil and cold solution may be mixed and the mixture heated to the desired temperature above 50° C. either during emulsification or after the formation of the emulsion. This heating step is of particular value when the emulsion includes a surfactant that are oil-in-water emulsifiers at ambient temperatures but water-in-oil emulsifiers at higher temperatures.

The surfactants are generally nonionic. Preferably they are ethyleneoxide condensates of sorbitan esters or of sorbitol esters but other suitable surfactants are glycol esters and ethyleneoxide condensates of nonyl or other alkyl phenols, ethylene oxide condensates of fatty alcohols or acids and ethyleneoxide propyleneoxide copolymers. Mixtures may be used.

The preferred materials are ethoxylated sorbitan monooleate (e.g. Tween 81, containing 5 ethoxy groups and HLB about 10), ethoxylated sorbitol septaoleate (e.g. Arlatone T, containing about 40 ethoxy groups and HLB about 9.5) and polyethylene glycol oleates. Suitable low HLB surfactants include sorbitan esters such as Span 80 (sorbitan monooleate, HLB about 4.3). Span, Tween and Arlatone are trade marks.

The amount of surfactant, if present, is generally from 0.1 to 5%, preferably 0.3 to 2%, by weight of the oil phase or 0.01 to 1% by weight of the emulsion.

Stabiliser may be included to stabilise the emulsion, especially if it is to be stored before use. Suitable stabilisers are oil soluble polymeric stabiliser and preferably are amphipathic copolymers of one or more hydrophobic monomers with one or more hydrophilic monomers. The hydrophobic monomers may be acrylates such as $C_8$ to $C_{24}$, optionally together with $C_1$ and $C_4$, alkyl esters of acrylic or methacrylic acid, for instance cetostearyl or stearyl methacrylate, optionally copolymerised with methyl methacrylate. The hydrophilic monomers, may be anionic, cationic or non-ionic, preferably being methacrylic acid or other acrylic monomer. Examples of preferred stabilisers are described in British Patent Specification No. 1482515 to which reference should therefore be made. The preferred stabilisers are copolymers of ceto stearyl methacrylate and methacrylic acid containing 60–70% molar of the methacrylate ester. Other polymeric stabilisers include polyhydroxy stearic acid-polyethylene glycol condensates, for instance with oleic acid, and maleic polymers such as those described in U.S. Pat. No. 4,339,371.

The amount of stabiliser, if present, is generally from 0.1 to 5%, preferably 0.3 to 2% by weight of the oil phase or 0.01 to 1% by weight of the emulsion. The ratio of surfactant to stabiliser may be from 1:3 to 3:1.

The emulsion can be spray dried under conditions that will give a powder and using conventional spray drying apparatus provided with means for collecting evaporated non-aqueous liquid and generally provided with means for supplying nitrogen through the spray dryer as the drying medium. Typically the inlet temperature for the spray drying nitrogen or other gas is from 120° to 200° C., preferably around 150° C., and the outlet temperature is from 50° to 100° C., preferably around 70° C.

The conditions of spray drying must be such that substantially all the non-aqueous liquid is evaporated, and in particular the final product does not contain a continuous phase of non-aqueous liquid but is either totally free of it or possibly has a small residue on each particle. The conditions of drying must also be such that the water content of the polysaccharide particles is reduced sufficiently that the particles do not undesirably stick to each other when they are collected in the spray drier or subsequently handled. The maximum water content that can be tolerated in the spray dried particles will depend upon, for instance, the amount of stabiliser since the presence of a significant amount of stabiliser will prevent or minimise sticking of relatively high water content particles. The amount of water in each particle must generally be minor, based on the weight of polysaccharide and water and is normally less than 30%, generally below 25% and preferably below 10%. Best results are generally obtained when the water content is in the region 5 to 10%.

The nozzle by which the emulsion is sprayed into the spray dryer is usually an atomiser rotating at high speed, for instance above 20,000 rpm, typically 30,000 to 70,000 rpm. The described emulsions can easily be sprayed by conventional apparatus to form fine particles which dry during their passage through the spray dryer. This is in contrast to what happens if an attempt is made to spray dry even a very dilute solution of Xanthan. For instance, even at 2% concentration such a solution causes strings in the spray dryer nozzle and will either block the apparatus or will, at best, give a product of very non-uniform size.

The size of the polysaccharide particles obtained by spray drying appears to depend primarily upon the particle size in the emulsion but may also depend, in some processes, upon the degree of atomisation in the spray dryer. In many processes it appears that the size of the final dry polysaccharide particles will be strongly influenced by, and will generally be the same as, the dry particle size of the aqueous polysaccharide particles in the emulsion and so may depend upon the emulsification conditions. Even if the size is influenced by the spraying conditions, a great advantage of the spray drying process is that it is possible, for the first time, to obtain a powdered polysaccharide having a narrow range of particle sizes and it is also possible to obtain, for the first time, a powdered polysaccharide having a narrow and small range of particle sizes.

It may be necessary to sieve the product from the spray dryer in order to remove grossly oversized particles. The total amount of them in the product is generally less than 5%.

According to a second aspect of the invention a powdered polysaccharide has at least 90% by weight of the particles within a particle size range of not more than 100 microns and preferably not more than 75 microns, and preferably at least 75% by weight of the particles are within a particle size range of not more than 50 microns.

These powdered polysaccharides conveniently fall into one of two classes. One class have an average particle size above 50 microns, but generally below 250 microns and can, for convenience, be termed beads. Preferably the average particle size is from 70 or 100 microns to 150 or 200 microns. Preferably at least 90% by weight of the beads are below 200 microns in size. Their production generally requires the initial formation of a very coarse particle size emulsion, for instance an emulsion that contains little or no emulsifier, for instance below 1% or 0.8%, and often below 0.5%, by weight of the emulsion.

The other class of novel powdered polysaccharide according to the invention is much finer and has an average particle size below 50 microns and generally above 10 microns, preferably from 20 to 40 microns. At least 90%, and preferably at least 95% by weight of the particles have a size below 100 microns and preferably below 75 microns. Preferably at least 75% by weight of the particles have a size below 70 microns, and preferably below 50 microns. Preferably at least 50% by weight of the particles have a size below 60 microns, preferably below 40 microns.

The novel powdered products are preferably made by the described spray drying process but can be made by other techniques. For instance products having the desired narrow particle size range can be obtained by very careful and repeated sieve fractionation of powdered polysaccharide made by conventional methods. However this is generally much less cost effective and will generally provide an inferior product.

The novel powdered polysaccharides are very advantageous compared to conventional powdered polysaccharides (having a wide range of particle sizes) because their narrow particle size distribution greatly facilitates putting them into solution by mixing with water.

The individual particles of polysaccharide are preferably coated with surfactant or stabiliser that will promote the the distribution of the particles into water, upon addition with water. The surfactants and stabilisers mentioned above, and especially the surfactants whose HLB decreases with decreasing temperature, are particularly preferred in this respect.

A further advantage of the very fine particulate polysaccharides, having an average particle size below 50 microns, is that the fine particles permit much more rapid dissolution into water than conventional polysaccharides which have always contained significant quantities of larger particles. However when handling the very fine polysaccharide powder, dusting can be a problem and mixing into water can be difficult. Preferably therefore the fine powder is dispersed into a non-aqueous liquid.

According to a third aspect of the invention, a polysaccharide dispersion comprises a dispersion in non-aqueous liquid of powdered polysaccharide of which at least 90% and preferably at least 95% by weight of the particles have a size below 100 microns, the average particle size of the particles preferably being below 50 microns, the preferred maximum particle sizes and average particle sizes all being as discussed above. Preferably the particles are coated with surfactant or stabiliser, as discussed above. The dispersion is best made by mixing into the non-aqueous liquid polysaccharide powder made by the spray drying technique described above.

The non-aqueous liquid may be any liquid in which the polysaccharide does not swell unacceptably and so may be polar or non-polar. It is generally preferred to use a relatively non-volatile hydrocarbon oil.

The dispersion should be substantially stable, in that the particles either stay permanently suspended in the non-aqueous liquid or can easily be resuspended by stirring. With an appropriate choice of liquid and a very small particle size, adequate stability may be attainable without any additives in the dispersion. Often however it is desirable to add a dispersion stabiliser, for instance a material that will have the effect of thickening the continuous phase. The stabiliser may therefore be a synthetic polymer that will thicken the aqueous phase or an inorganic material, such as a clay, for instance bentone clay or other organophilic clay. The total amount of stabiliser in the dispersion is preferably below 10% by weight of the dispersion, most preferably below 5% by weight. Suitable non-aqueous liquids and suspending agents are described in, for instance, European Patent Specification 39128 but in the invention much lower amounts of stabiliser will be required than are recommended in that since the particles are much smaller.

The dispersion should be water-dispersable so that the polysaccharide can be dissolved into water simply by dispersing the dispersion into water and exposing the dispersed particles to the bulk water. The process of dispersion is facilitated by the application of shear or, particularly, by the provision of a surfactant that will act as an oil in water emulsifier. The high HLB surfactants discussed above will generally serve for this purpose during the dissolution stage especially if they required heating during emulsification, and their use is particularly advantageous. However it may be desirable to include a conventional oil-in-water surfactant for promoting the distribution of the dispersion into water and the dissolution of the polysaccharide particles. Suitable amounts are from 1 to 5% by weight of the dispersion. This may be added to the dissolving water, or to the dispersion and may be included during its preparation or immediately prior to use. The surfactant preferably has HLB 7-11 at room temperature.

The dispersion of dry polysaccharide in oil preferably contains from 30 to 75%, preferably 50 to 75% by weight dry polysaccharide with the balance being non-aqueous liquid containing, if necessary, dispersion stabiliser.

The invention is of particular value when the polysaccharide is a Xanthan, for instance as obtained by fermentation of Xanthamonas or is other microbial polysaccharide having, for instance, viscosity characteristics rather similar to Xanthans, i.e. dilute solutions of, for instance, 4% have a consistency index above 20,000 cP, and in particular the polysaccharides obtained by fermentation of Pseudomonas. However the invention is of value with all microbial polysaccharides (commonly referred to as biopolymers) and other polysaccharides such as starch and derivatives thereof, water soluble cellulose derivatives, galactomannon gums, plant exudates and algal gums such as alginate and carrageenan. The preferred polysaccharides give a 4% aqueous solution having a consistency index above 20,000 cPs.

The invention is also of value wherever these or other polysaccharides have to be provided in powdered solid or fluid concentrated form with maximum retention of activities. Suitable downhole uses for Xanthans and other polysaccharides include drilling muds, workover fluids and other well stimulation fluids, completion fluids, and for providing water retention in cement, especially when the polysaccharide is a cellulose ether such as carboxymethyl hydroxyethyl cellulose. The compositions can also be used in any other situation where it is necessary to present the polysaccharide in high concentration and with high activity, and especially when it is required to provide a composition which will readily dissolve into water to form a viscous solution.

Although it is generally desirable that the polysaccharide remains uncross-linked, if cross-linking and partial insolubilisation is required a small amount of glyoxal or other appropriate cross-linking agent may be included either in the aqueous emulsion that is to be spray dried or in the final dry dispersion.

The following are non-limiting examples of the invention.

EXAMPLE 1

227 parts by weight of a very viscous aqueous solution obtained by dissolving 7 parts Xanthan powder in 100 parts water is emulsified into an oil phase consisting of 95 parts Shell Solvent 41, 1 part Tween 81 (surfactant HLB 10) and 1 part of a stabiliser formed of 2:1 molar copolymer of cetostearyl methacrylate and methacrylic acid. The emulsion is formed by homogenisation using a Silverson Mixer at 80° C. for 15 minutes and allowed to cool. The emulsion is stable for standing for at least 4 weeks.

This emulsion is then spray dried in a spray drying tower provided with solvent recovery apparatus and under conditions that produce a product that is a powder. The atomiser by which the emulsion is sprayed into the tower rotates at 45,000 rpm. Nitrogen is passed through the tower at an inlet temperature of 150° C. and an outlet temperature of 70° C.

The resultant powder is passed through a 700 micron sieve to remove about 5% by weight large flakes, above 2 mm in size. The remainder has a particle size distribution 100% by weight below 90 microns, about 90% below 50 microns, about 75% below 40 microns, about 50% below 30 microns and about 20% below 20 microns and about 2% below 10 microns.

55 parts by weight of this powder is stirred slowly into 43 parts Shell Pale Oil 60 thickened with 2 parts organophilic clay (Bentone SD) and is then stirred rapidly for 5 minutes with a Hamilton Beach Mixer. The product is a stable suspension that does not settle over several days. Its viscosity measured on a Brookfield RVT Spindle 3 at 0.5 rpm is 13,000 cP, at 5 rpm 2,760 cP and at 100 rpm 668 cP.

A solution of the xanthan in water is obtained by mixing this dispersion into water, optionally in the presence of oil-in-water emulsifier in the water or in the dispersion.

EXAMPLE 2

In a modification of the process of Example 1, beads having particle sizes mainly in the range 90 to 150 ° are obtained if the amount of Tween 81 is reduced or eliminated or if the aqueous phase is blended into the oil phase by vigorous stirring rather than by homogenisation. The resultant beads can be screened to remove oversize particles and, if necessary, can be sieved to reduce their range of particle sizes. They are free flowing and can easily be stirred into water to form a solution.

EXAMPLE 3

The process of Example 1 may be repeated using, instead of a solution obtained from Xanthan powder and water, a concentrate obtained by fermentation of Xanthomonas or Pseudomonas followed by purification and concentration in known manner to give a polysaccharide concentration of about 7% and a consistency index above 50,000 cPs.

We claim:

1. A process of making a powdered microbial polysaccharide comprising spray drying an emulsion in a non-aqueous liquid of an aqueous solution of the said microbial polysaccharide and thereby producing the powdered microbial polysaccharide substantially free of non-aqueous liquid.

2. A process according to claim 1 comprising emulsifying an aqueous solution of microbial polysaccharide having consistency index above 20,000 cPs into a non-aqueous liquid to form an emulsion and then spray drying the said emulsion and thereby producing powdered microbial polysaccharide substantially free of non-aqueous liquid.

3. A process according to claim 1 in which the microbial polysaccharide content of the emulsion is from 1 to 15% and the microbial polysaccharide content of the powdered product is above 80% by weight.

4. A process according to claim 1 in which the emulsion is stabilised by the presence therein of a stabilising component selected from water-in-oil emulsifiers having HLB below 11 and amphipathic copolymeric stabilisers.

5. A process according to claim 1 in which the microbial polysaccharide is made by fermentation of a microorganism selected from Xanthamonas and Pseudomonas.

6. A process according to claim 1 in which the microbial polysaccharide content of the emulsion is from 1 to 15% and the microbial polysaccharide content of the powdered product is above 80% by weight.

7. A process according to claim 6 in which the emulsion is stabilised by the presence therein of a stabilising component selected from water-in-oil emulsifiers having HLB below 11 and amphipathic copolymeric stabilisers.

8. Spray dried, powdered, microbial polysaccharide having an average particle size below 250 microns and at least 90% by weight of the powder having a particle size range extending over not more than 100 microns.

9. Spray dried, powdered, polysaccharide according to claim 8 wherein the microbial polysaccharide is one that, as a 4% aqueous solution, has a consistency index above 20,000 cPs.

10. A powdered microbial polysaccharide according to claim 8 wherein at least 75% by weight of the particles has a size range extending over not more than 50 microns.

11. A powdered microbial polysaccharide according to claim 8 wherein the average particle size is above 50 microns.

12. A powdered microbial polysaccharide according to claim 8 wherein the average particle size is between 10 and 50 microns and at least 90% of the particles have a size below 100 microns.

13. A powdered microbial polysaccharide according to claim 8 in which the microbial polysaccharide is made by fermentation of a microorganism selected from Xanthamonas and Pseudomonas.

14. A powdered microbial polysaccharide according to claim 13 wherein at least 75% by weight of the particles has a size range extending over not more than 50 microns.

15. A powdered microbial ploysaccharide according to claim 14 wherein the average particle size is between 10 and 50 microns and at least 90% of the particles have a size below 100 microns.

* * * * *